United States Patent [19]

Elser

[11] 4,285,366
[45] Aug. 25, 1981

[54] PRESSURE MEDIUM CONTROL SYSTEM FOR AUXILIARY POWER STEERING SYSTEMS

[75] Inventor: Dieter Elser, Essingen-Lauterburg, Fed. Rep. of Germany

[73] Assignee: Zahnradfabrik Friedrichshafen, AG., Friedrichshafen, Fed. Rep. of Germany

[21] Appl. No.: 950,571

[22] Filed: Oct. 12, 1978

Related U.S. Application Data

[63] Continuation-in-part of Ser. No. 37,031, May 8, 1979, Pat. No. 4,232,586, which is a continuation of Ser. No. 825,477, Aug. 17, 1977, abandoned.

[30] Foreign Application Priority Data

Oct. 12, 1977 [DE] Fed. Rep. of Germany ....... 2745786

[51] Int. Cl.³ ................... F15B 13/04; F16K 11/02
[52] U.S. Cl. .............................. 137/625.23; 91/31; 91/467; 137/625.24; 137/625.3; 137/625.32
[58] Field of Search ........... 91/31, 467, 375 A, 375 R, 91/6, 449; 137/625.3, 625.31, 625.32, 625.23, 625.24, 625.28; 251/117

[56] References Cited

U.S. PATENT DOCUMENTS

| 371,063 | 10/1887 | Hays | 137/625.28 X |
|---|---|---|---|
| 817,158 | 4/1906 | Barr | 137/625.3 |
| 1,354,580 | 10/1920 | Schumacher | 137/625.3 X |
| 2,612,184 | 9/1952 | Evans | 91/31 X |
| 2,946,348 | 7/1960 | North | 137/625.21 |
| 3,027,918 | 4/1962 | Robra | 91/6 X |
| 3,094,173 | 6/1963 | Hausmann et al. | 91/31 X |
| 3,138,175 | 6/1964 | Chilcoat | 137/625.3 |
| 3,296,940 | 1/1967 | Eddy et al. | 137/625.24 X |
| 3,468,341 | 9/1969 | Newcomb et al. | 137/625.3 |
| 4,063,490 | 12/1977 | Duffy | 91/467 |

FOREIGN PATENT DOCUMENTS

| 881309 | 9/1971 | Canada | 137/625.23 |
|---|---|---|---|
| 958176 | 9/1949 | France | 91/375 |
| 962794 | 7/1964 | United Kingdom | 91/467 |

*Primary Examiner*—Irwin C. Cohen
*Attorney, Agent, or Firm*—Zalkind & Shuster

[57] ABSTRACT

Precise control over outlet pressure as a function of valve position is obtained for operation of a servomotor by a rotary plug valve journaled at opposite ends in a control bushing having conduit channels in fluid communication with passage grooves in the plug valve to form a plurality of parallel flow paths between a pressure inlet and two directional outlets to the servomotor. The edge formed on the plug valve by a passage groove in only one of the parallel flow paths to each of the outlets is beveled to improve valve control precision.

5 Claims, 3 Drawing Figures

PRESSURE MEDIUM CONTROL SYSTEM FOR AUXILIARY POWER STEERING SYSTEMS

This application is a CIP of Ser. No. 37,031 May 8, 1979 now U.S. Pat. No. 4,232,586 which in turn is a continuation of Ser. No. 825,477 filed Aug. 17, 1977, and now abandoned.

BACKGROUND OF THE INVENTION

This invention relates to a rotary control valve assembly for controlling operation of a servomotor in an auxiliary power steering system for an automotive vehicle, and more particularly to an improvement to the control valve assembly disclosed in my prior copending application Ser. No. 825,477, filed Aug. 17, 1977, abandoned in favor of continuation application, Ser. No. 37,031, filed May 8, 1979, now U.S. Pat. No. 4,232,586.

According to my prior copending application, a pressure medium control system is disclosed having a rotary plug valve which is journaled at its opposite axial ends by anti-friction bearings mounted in an associated control bushing. In this manner, precise response and perfect functioning is assured since hydraulic jamming of the rotary plug valve and an uncontrolled increase in friction caused thereby, is reliably avoided. The objective of the present invention is to further improve the operational behavior of said pressure medium control system.

Generally, control valve edges on the valve lands formed between the longitudinal passage grooves on a rotary plug valve, are arranged symmetrically on the periphery of the valve element and may be provided with phase control bevels. Such an arrangement is disclosed, for example, in German Pat. No. 1,181,077, column 4, lines 54-55 and in U.S. Pat. No. 4,063,490 to Duffy. The objective associated with such arrangements is to obtain a symmetrical distribution of equal fluid flow forces in order to avoid any resultant transverse force and development of friction therefrom on the rotary plug valve surfaces. Such control bevels are advantageous for regulating pressure that is switched on and off.

SUMMARY OF THE INVENTION

According to the present invention, more precise pressure control is achieved by beveling the edge of a passage groove formed in the external valve land surface of the rotary plug valve, the passage formed by the beveled edge opening into an inlet or exhaust channel of the control bushing. Further, beveling of the groove edges is confined to less than all of the parallel flow paths established between the inlet and outlet ports by the plurality of passage grooves in the rotary plug valve and associated conduit channels of the control bushing to thereby introduce an asymmetrical phase relationship between parallel control of otherwise equal volumetric parallel flow paths.

Since the rotary valve plug is journaled by anti-friction bearings at both ends with the advantage of hydraulic operation free of jamming, beveling of the control edges of the longitudinal passage grooves is simplified in accordance with one embodiment of the invention in that only one control bevel for each control direction is provided. Thus, only two control edges respectively establishing fluid flow to the outlet ports for directional operation of the servomotor are beveled. These control bevels, depending on the position of the longitudinal grooves, are either associated with one groove or two adjacent grooves to control flow from the supply pressure inlet to the exhaust return line. For the environment to which the present invention applies, it was discovered that the flow passage opened by a single control bevel for the selected directional control of the servomotor, provides for more precise pressure control than that possible with a rotary valve plug having several control bevels, assuming the same pressure and flow rates.

From the foregoing, it is evident that valve control precision reflected by the characteristic curve of pressure as a function of valve position increases proportionately with the decrease in the number of control bevels, assuming the same production tolerances in forming the control bevels. Alternatively, to obtain the same valve control precision, reflected by the characteristic curve of pressure as a function of valve position, production tolerances for the control bevels may be increased proportionately to the lowering of the number of control bevels.

Another advantage of the present invention resides in the fact that use of only one control bevel per control direction simplifies manufacture and enables use of simple tools, such as a die press or a profile cutter with only one setting.

BRIEF DESCRIPTION OF DRAWING FIGURES

The invention will be explained in more detail hereinafter on the basis of the drawings wherein:

FIG. 1 is a partial longitudinal section view of a steering gear with a rotary plug valve embodying the control bevels in accordance with the present invention, FIG. 2 is an enlarged transverse section view of the rotary plug valve taken substantially through a plane indicated by section line II—II in FIG. 1, and FIG. 3 is a section view similar to FIG. 2 of another embodiment of the invention.

DETAILED DESCRIPTION OF PREFERRED EMBODIMENTS

Figure 1:
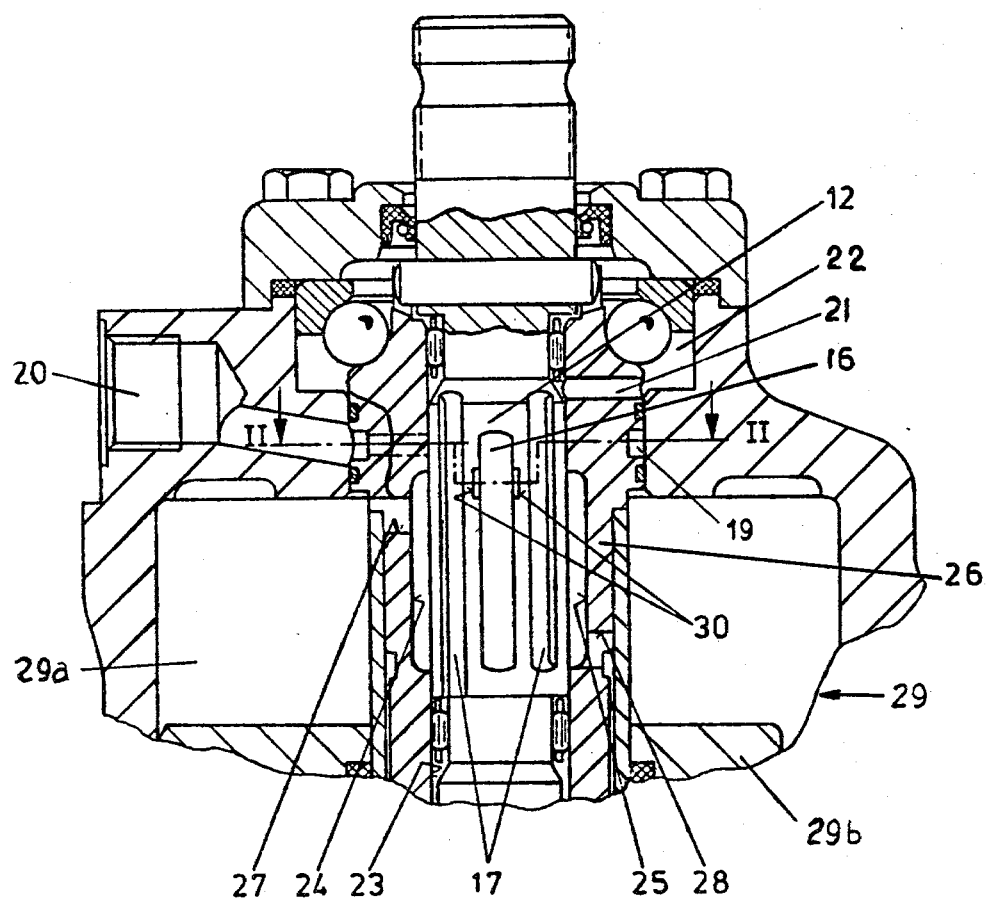
Figure 2:
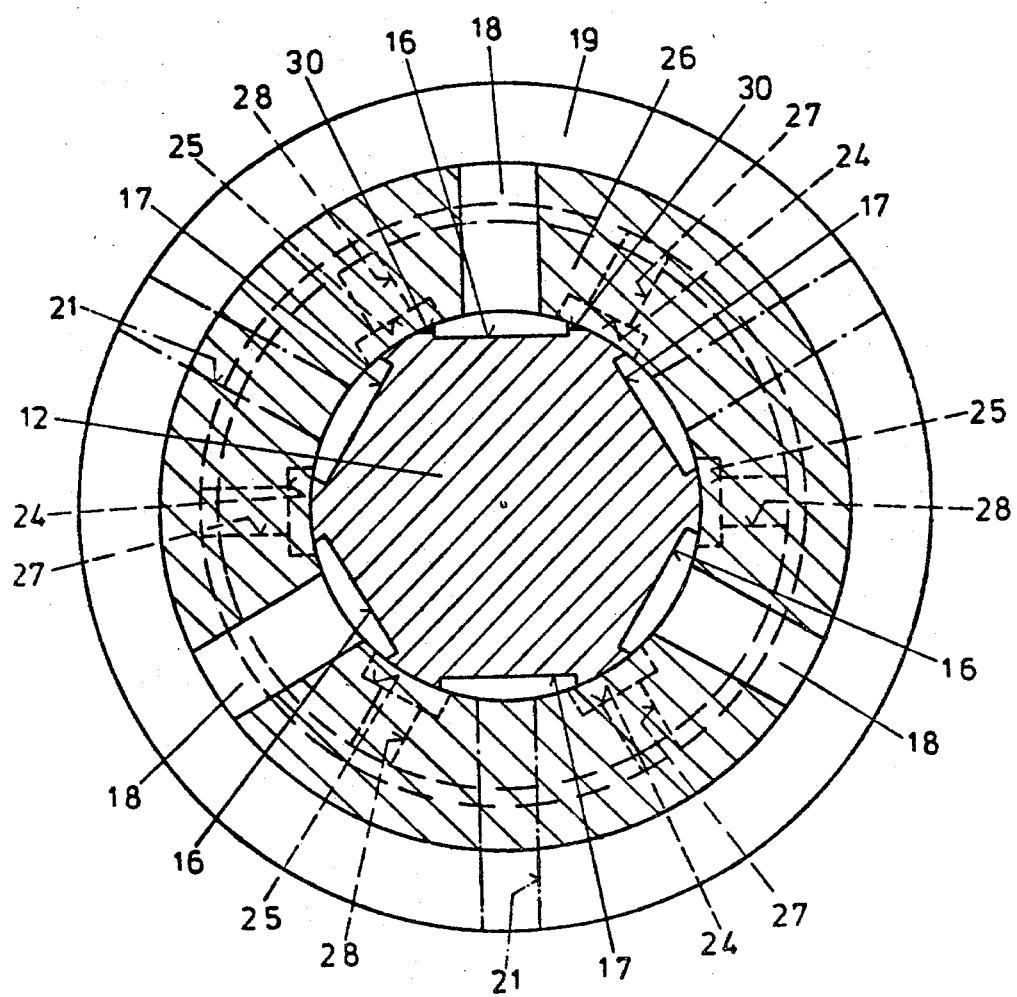

Referring now to the drawings, FIGS. 1 and 2 show a rotary plug valve in accordance with the invention consisting of a rotary plug element 12 and a control bushing 26. On the cylindrical surface of the rotary plug element 12, axially extending, longitudinal passage grooves 16 and 17 are milled in. The longitudinal passage grooves are connected by inlet conduit channels 18 and an annular groove 19 in the control bushing to an inlet fitting connection 20. Longitudinal passage grooves 17 are connected by exhaust channels 21 in the control bushing to a discharge chamber 22 in communication with a fluid return line (not shown). A cylindrical bore 23 of the control bushing 26 is also provided with longitudinal passage grooves 24 and 25 which are connected in alternating order by means of separate pressure outlet ports 27 and 28 with two opposing pressure chambers of a servomotor 29 such as chamber 29a shown in FIG. 1 on one side of the servomotor piston 29b.

According to the invention, the control edges formed at the intersections of the cylindrical surface of the rotary plug 12 and only one of the three longitudinal grooves 16 communicating with the inlet channels 18, have control bevels 30 as shown in FIG. 2. The control bevels could also be formed at the edges of one of the longitudinal grooves 17 leading to the exhaust channel 21 for fluid return. The channels 18 or 21, grooves 16 or 17 and grooves 24 and 25 form three parallel flow paths between the outlet ports 27 and 28 and either inlet 20 or discharge chamber 22. However, the two control bevels 30 are confined to only one of the parallel flow paths because they both open into a common inlet channel 18 communicating with a single one of the grooves 16 in the embodiment shown in FIG. 2.

Figure 3:
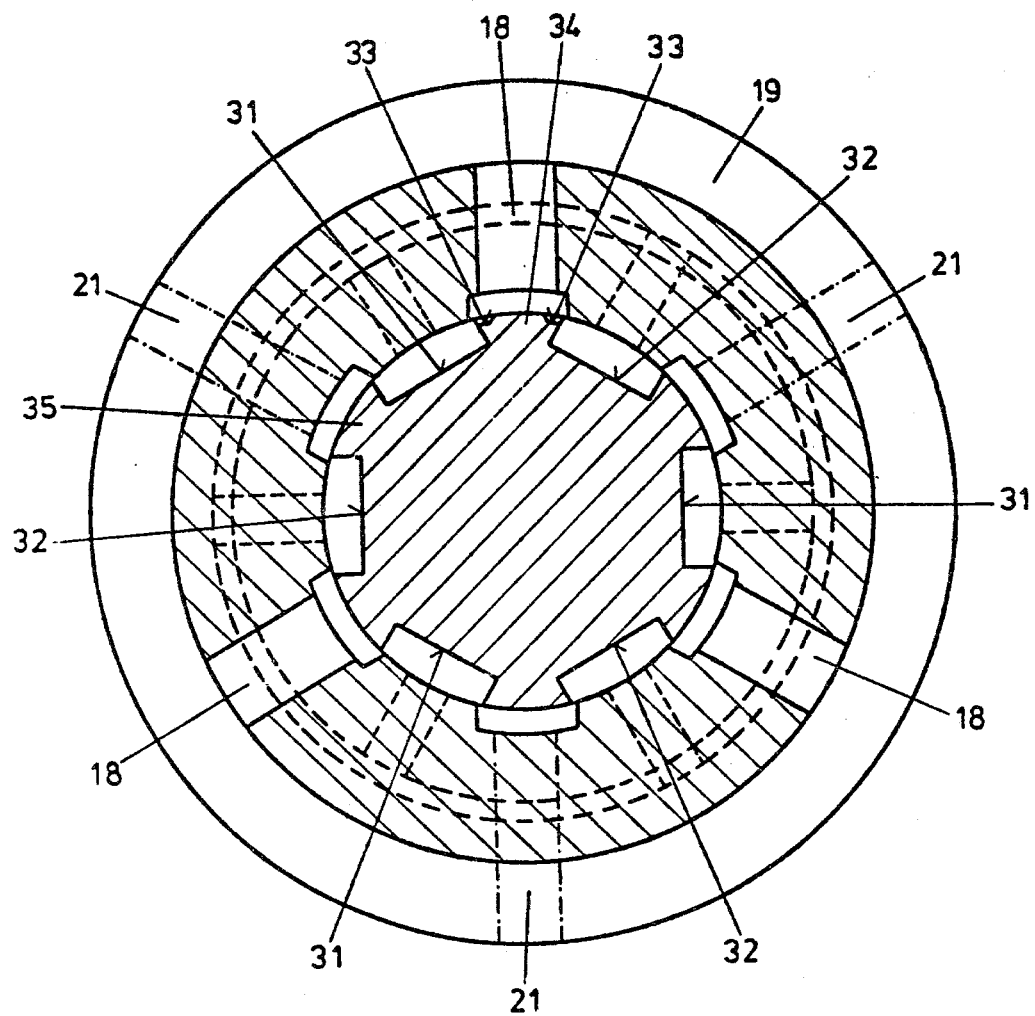

In the embodiment shown in FIG. 3, the adjacent control edges of one pair of adjacent longitudinal passage grooves 31 and 32 have been provided with control bevels 33 for communication with the servomotor pressure chambers. In this embodiment the inlet channel 18 and exhaust channel 21 in communication with the inlet and return lines respectively, lead to a bridge 34 and 35 spacing the grooves 31 and 32 of the rotary valve plug 12. As in the case of the embodiment of FIG. 2, the three parallel flow paths are established between the inlet or return and the outlets through channels 18 or 21 and the passage grooves in the rotary plug valve and control bushing, including the passage grooves 31 and 32. The two control bevels 33 are also confined to one of the parallel flow paths by opening into a common inlet channel 18, communicating however, with only two adjacent grooves, 31 and 32, in the rotary valve plug for the embodiment shown in FIG. 3.

In the central position of the rotary valve plug 12 as shown in the drawings, neither servomotor chamber is pressurized since the inlet channels 18 are in fluid communication with the exhaust channels 21 through the passage grooves in the rotary valve plug and control bushing. Angular displacement of the rotary valve plug in one direction or the other displaces the passage grooves relative to the channels 18 and 21 to block discharge flow from one of the outlet ports 27 and 28 to the discharge chamber 22 and increases the outflow of fluid to the other of the outlets along all three parallel flow paths. The effect of the single bevel edge 30 or 33 in only one of the three parallel flow paths on the total outflow for each position of the rotary valve plug 12, unexpectedly provides greater precision in controlling outlet pressure as a function of valve position when compared to an arrangement in which all three parallel flow paths are provided with the same groove edge bevels.

What is claimed is:

1. In combination with a control device for a pressure medium in an auxiliary power steering system having a rotary valve plug (12) journaled at opposite axial ends by anti-friction bearings mounted within a control bushing (26), passage means (16, 17, 31, 32) formed in the rotary valve plug including axially extending and symmetrically distributed passage grooves formed in the rotary plug and the control bushing and terminating in axially spaced relation to said opposite axial ends, and conduit means (18, 21) for conducting the pressure medium to and from two directional control outlets (27 and 28) along in-phase parallel flow paths of substantially equal flow volume respectively established through said grooves; means for improving pressure control of the pressure medium at the outlets in response to positioning of the rotary plug, comprising only two beveled edges (30, 33) formed on the rotary plug between the conduit means and the passage means along only one of the parallel flow paths to each of said outlets, respectively, to conduct the pressure medium therein in out-of-phase relation to a plurality of the other of the in-phase parallel flow paths.

2. The combination of claim 1, wherein said conduit means includes a plurality of channels (18, 21) in the control bushing communicating with both of the outlets, said beveled edges (30) being formed on opposite sides of only one of the latter grooves, and opening into only one of the channels associated therewith.

3. The combination of claim 1, wherein said conduit means includes a plurality of inlet channels (18) each of said channels communicating with both of said outlets through two adjacent ones of said plurality of grooves (31 and 32) formed on the rotary plug, said beveled edges (33) being formed on adjacent sides of said two adjacent grooves and opening into only one of the channels.

4. The combination of claim 1, wherein said rotary valve plug has an external cylindrical surface within which said grooves are formed, each of the grooves establishing one of said parallel flow paths between the outlets and the conduit means, said beveled edges being formed at two adjacent intersections of the grooves with the cylindrical surface.

5. The combination of claim 1 or 4, wherein said conduit means includes a plurality of channels (18) extending radially through the control bushing through which the parallel flow paths extend, said beveled edges opening into only one of the channels.

* * * * *